United States Patent [19]

Kasting

[11] 4,257,370
[45] Mar. 24, 1981

[54] COMBINED GEAR COVER AND MOUNT FOR AN INTERNAL COMBUSTION ENGINE

[75] Inventor: Edward W. Kasting, Seymour, Ind.

[73] Assignee: Cummins Engine Company, Inc., Columbus, Ind.

[21] Appl. No.: 974,562

[22] Filed: Dec. 29, 1978

[51] Int. Cl.³ .............................................. F16M 1/02
[52] U.S. Cl. ............................. 123/198 E; 123/195 C; 181/247
[58] Field of Search ........... 123/198 E, 198 R, 195 C, 123/195 A, 195 R; 181/204; 180/299, 312

[56] References Cited

U.S. PATENT DOCUMENTS

| | | |
|---|---|---|
| 1,883,671 | 10/1932 | Fort . |
| 2,303,093 | 11/1942 | Schreck . |
| 3,263,663 | 8/1966 | Connell ............................ 123/195 R |
| 3,726,365 | 4/1973 | Russell . |
| 3,817,661 | 6/1974 | Ingalls et al. ........................ 181/240 |
| 3,942,502 | 3/1976 | Gorres et al. ..................... 123/195 R |
| 4,109,751 | 8/1978 | Kabele ................................ 181/247 |

*Primary Examiner*—William D. Martin, Jr.
*Attorney, Agent, or Firm*—Sixbey, Friedman & Leedom

[57] ABSTRACT

A combined gear cover and mount for an internal combustion engine is disclosed for use on an engine having a vibration damper mounted on a projecting end of the engine crankshaft wherein the gear cover includes a housing for enclosing the vibration damper while reenforcing the engine mount formed integrally with the gear cover. The gear cover is adapted to connect with a gear plate mounted directly on the engine block to form an enclosure for the gear train of the engine. The gear cover also includes an integral fan clutch housing and a lubrication fluid transfer passage for an engine driven air compressor.

17 Claims, 9 Drawing Figures

COMBINED GEAR COVER AND MOUNT FOR AN INTERNAL COMBUSTION ENGINE

TECHNICAL FIELD

This invention relates to the field of gear housing design for covering or shrouding the gear train of an internal combustion engine of the type wherein the gear train is used to drive a plurality of engine accessories.

BACKGROUND ART

A lighter weight, higher strength, more compact internal combustion engine has consistently been the goal of engine designers. Recently, the rising cost of fossil fuel has further intensified the need for an engine having such desirable characteristics since ligther weight, greater strength and reduced size can lead to greater fuel efficiency in many applications. For example, greater efficiency results when the engine is used to power a vehicle because a smaller, lighter weight engine permits an overall reduction in vehicle size and weight which translates into greater fuel economy. Unfortunately, the advanced state of engine design means that even small size or weight reductions are difficult to achieve without sacrifice of other desirable engine characteristics.

The use of a single multi-purpose gear train mounted at one end of an engine block for driving all engine accessories directly through a gear connection with the engine crankshaft is well known as illustrated in U.S. Pat. No. 3,263,663. Provision of a single drive train has numerous advantages including the reduction of parts and weight which would otherwise result if additional driving connections were made with the crankshaft. To allow lubrication of the gears and to provide mounting structure for some of the engine accessories, a housing can be provided around the gear train. Naturally, the greater number of functions which the gear cover can be designed to perform, the greater will be the weight and cost reduction potential thereof. U.S. Pat. No. 3,263,663 discloses such an unitary housing having multiple functions including shrouding the accessory gear train and providing support to a variety of engine accessories. The unitary housing of U.S. Pat. No. 3,263,663 also includes an integral engine mount which further increases the weight reducing potential of this design. However, the engine mount is spaced a substantial distance from the engine block as compared with the general size of the engine. Accordingly, a relatively large moment arm exists between the engine mount and the interface between the housing and motor block, thereby requiring greatly thickened housing walls and increased use of reinforcing webs all of which adds significantly to the weight of the unitary housing.

Other types of detachable cover plates for mounting engine accessories are known in the prior art such as disclosed in U.S. Pat. No. 2,303,093 whereby the members are designed to allow grouping of the engine accessories for driving connection with the crankshaft of the engine through a drive train encased by the detachable plate member. As illustrated in U.S. Pat. No. 2,303,093, the detachable cover plate may be provided with an exterior enlargement forming a recess within which is received a vibration controlling element mounted on the engine crankshaft outboard of the driving connection between the crankshaft and the engine accessories. U.S. Pat. No. 2,303,093 does not, however, suggest a manner whereby the detachable cover plate can be employed to perform an engine mounting or supporting function.

Engine mounts which perform an incidental shrouding function relative to the drive connection between the engine crankshaft and plural engine accessories are known as illustrated by U.S. Pat. No. 1,883,671 but such engine mounts are not disclosed for use in combination with a cover designed to completely encase a gear train extending between the crankshaft and a plurality of accessories mounted on the cover. Disclosures relating to combined mounts and shrouds have thus not suggested a gear cover design having multi-functional purposes wherein the cover portions performing the various functions cooperate in a synergistic manner to improve the strength to weight ratio of the engine.

Numerous efforts to reduce the noise produced by internal combustion engine operation have recently been pursued resulting in such concepts as disclosed in U.S. Pat. No. 3,726,365 wherein specialized structure is employed within the engine in an attempt to change the natural frequency of the engine block. While useful in some instances, the complex nature of the noise reducing structure illustrated in this patent is not practical in most commercial engine applications.

In short, the prior art has failed to disclose a multipurpose gear cover design for an internal combustion engine which is simultaneously characterized by high strength to weight ratio, compact size and noise suppressing capability.

DISCLOSURE OF INVENTION

The basic object of this invention is to overcome the disadvantages of the prior art as listed above and, in particular, to provide a gear cover for covering or shrouding the gear train of an internal combustion engine wherein the gear cover includes separate portions designed to perform independent diverse functions and to cooperate synergistically to improve the overall strength to weight ratio of the gear cover and engine block on which the cover is mounted.

A more specific object of this invention is to provide a gear cover for the accessory gear train of an internal combustion engine when the gear cover is provided with a front panel arranged to be positioned outwardly of the gear train and an engine mounting means formed integrally with the front panel for supporting one end of the engine entirely through the gear cover and further including a damper housing means inwardly connected with the front panel and the engine mount for receiving and enclosing the vibration damper when the cover is mounted on the engine and for reinforcing the integral connection between the engine mount and the front panel of the gear panel.

Still another object of this invention is to provide a gear cover for the accessory gear train of an internal combustion engine having a front panel arranged to be positioned outwardly of the gear train of a generally parallel relationship to the end wall of the internal combustion engine and spaced therefrom by a distance approximately equal to the distance between the end wall of the internal combustion engine and the outermost portion of the drive gear which connects the gear train to the crankshaft of the engine.

Yet another object of this invention is to provide a gear cover including a damper housing extending outwardly from the front panel of the gear cover in order to provide a recess for receiving a torsional vibration damper mounted on the projecting end of the engine crankshaft combined with means for increasing the natural frequency of the cover including an annular recess formed in the forward wall of the damper housing whereby the natural frequency of the gear cover is increased, thus, potentially reducing the noise generating capacity of the gear cover and providing further strengthening characteristics to the gear cover in the area adjacent to the motor mount integrally formed on the gear cover.

A further object of the subject invention is to provide a gear cover for enclosing an internal combustion engine gear train adapted to drive a multiplicity of engine accessories wherein at least some of the engine accessories are mounted or provided with driving torque through a shaft rotatably mounted on the gear cover and wherein the gear cover includes a lubrication fluid transfer boss for transferring lubrication fluid from the engine block to one of the engine accessories driven by the gear train encased within the gear cover.

A still more specific object of the subject invention is to provide a gear housing for the accessory gear train of an internal combustion engine including a gear plate arranged to be mounted on the engine adjacent the gear train and a gear cover having a front wall and a perpendicularly arranged side wall terminating in a rim adapted to engage the gear plate to completely enclose the gear train, wherein the gear plate includes side extensions shaped to extend outwardly beyond the sides of the engine and to contain openings through which driving connections can be made between accessories mounted on the side of the engine and individual gears in the gear train within the gear housing.

Still other and more specific objects of the subject invention may be appreciated by consideration of the following Brief Description of the Drawings and the following description of the Best Mode for Carrying Out the Invention.

BEST MODE FOR CARRYING OUT THE INVENTION

Figure 1:
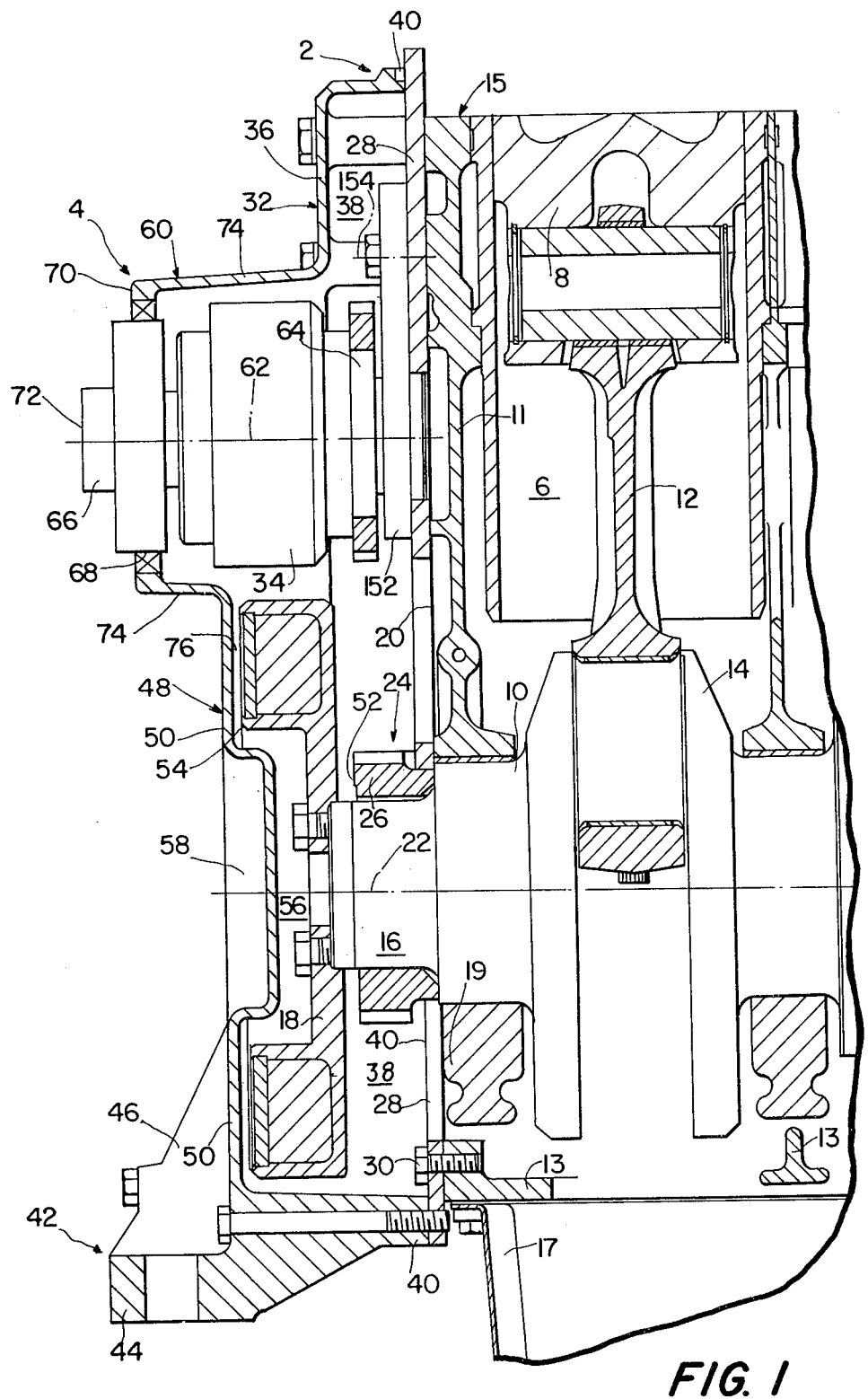
FIG. 1 is a broken-away cross-section view of an internal combustion engine on which a gear housing designed in accordance with the subject invention has been mounted.

Referring initially to FIG. 1, a broken cross-sectional view appears of an internal combustion engine 2 on which a gear housing 4 designed in accordance with the subject invention is mounted. The internal combustion engine 2 is of the compression ignition type and includes a plurality of cylinder cavities 6, only one of which is illustrated in FIG. 1, within which corresponding pistons 8 are positioned for reciprocal movement which is in turn converted into rotational movement of the crankshaft 10 by means of connecting rods 12 extending between piston 8 and connecting rod journal 14 of the crankshaft. The internal combustion engine 2 includes an engine block 15 which may be of the type described in greater detail in U.S. patent application Ser. No. 22,647 filed Mar. 21, 1979 and entitled Composite Engine Block Having High Strength To Weight Ratio and assigned to the same assignee as the subject invention. The disclosure of this co-pending application is incorporated herein by reference.

Engine block 15 as described in the above-identified patent appliation includes a main frame 11 containing the cylinder cavity 6, a lower oil pan adapter or ladder frame 13 mounted on the bottom surface of the main frame 11 and an oil pan 17 connected to the lower surface of the ladder frame 13. Crankshaft 10 is mounted within the composite engine block by means of main bearing caps 19 such that the end 16 of the crankshaft projects through an end wall 20 of the composite block formed by the main frame 11 and ladder frame 13 wherein the end wall defines a plane which is perpendicular to the rotational axis 22 of the crankshaft 10. In addition to those accessories required for the operation of every internal combustion engine, i.e., fuel, lubrication and water pumps, most every use of an internal combustion engine requires several additional accessories such as a cooling fan, electrical generator, air compressor, air conditioning compressor, power steering and/or hydraulic pump and alternator. In order to provide driving torque to such accessories, it is desirable to provide a single gear train, only partially illustrated in FIG. 1, adjacent to the end wall 20 of the internal combustion engine. The gear train 24 includes a plurality of engaged radial gears mounted in a plane generally parallel to the plane defined by the end wall 20 of the internal combustion engine. While the gear train will be described in greater detail hereinbelow, FIG. 1 illustrates the position occupied by the drive gear 26 of the gear train which is adapted to provide a driving connection between the crankshaft 10 and the remaining gears of the gear train 24. As is apparent in FIG. 1, drive gear 26 is a radial gear which is keyed to projection 16 of the crankshaft intermediate the torsional vibration damper 18 and the end wall 20 of the internal combustion engine.

As illustrated in FIG. 1, the crankshaft 10 includes a projecting end 16 on which is mounted a torsional vibration damper 18. While such vibrational dampers are normally mounted on the exterior of the internal combustion engine, the gear cover housing 4 of the subject invention has been designed to fully encompass the torsional vibration damper for reasons which will be described in greater detail hereinbelow.

Turning now more specifically to the gear housing 4, FIG. 1 shows that the gear housing is formed by a gear plate 28 mounted directly on the end wall 20 thereby separating the gear train 24 from the engine block main frame 11. The gear plate 28 is mounted on the engine block by means of connecting bolts 30, only one of which is illustrated in FIG. 1. As will be explained in greater detail hereinbelow, gear plate 28 includes side extensions shaped to extend outwardly beyond the sides of the engine block with such extensions containing apertures through which driving connections can be made between accessories mounted on the side of the engine and the individual gears in the gear train 24. This arrangement provides a very simple method of mounting the engine accessories in a relatively compact configuration while allowing the gear train to reside entirely within a single plane perpendicular to the rotational axis of the engine crankshaft. As is apparent in FIG. 1, the gear housing 4 includes a gear cover 32 having a generally concave configuration and adapted to be connected at its periphery with the gear plate 28 to form an enclosure within which a gear train 24 is contained along with the vibration damper 18 and a fan clutch 34 which will be described in greater detail hereinbelow.

Figure 2:
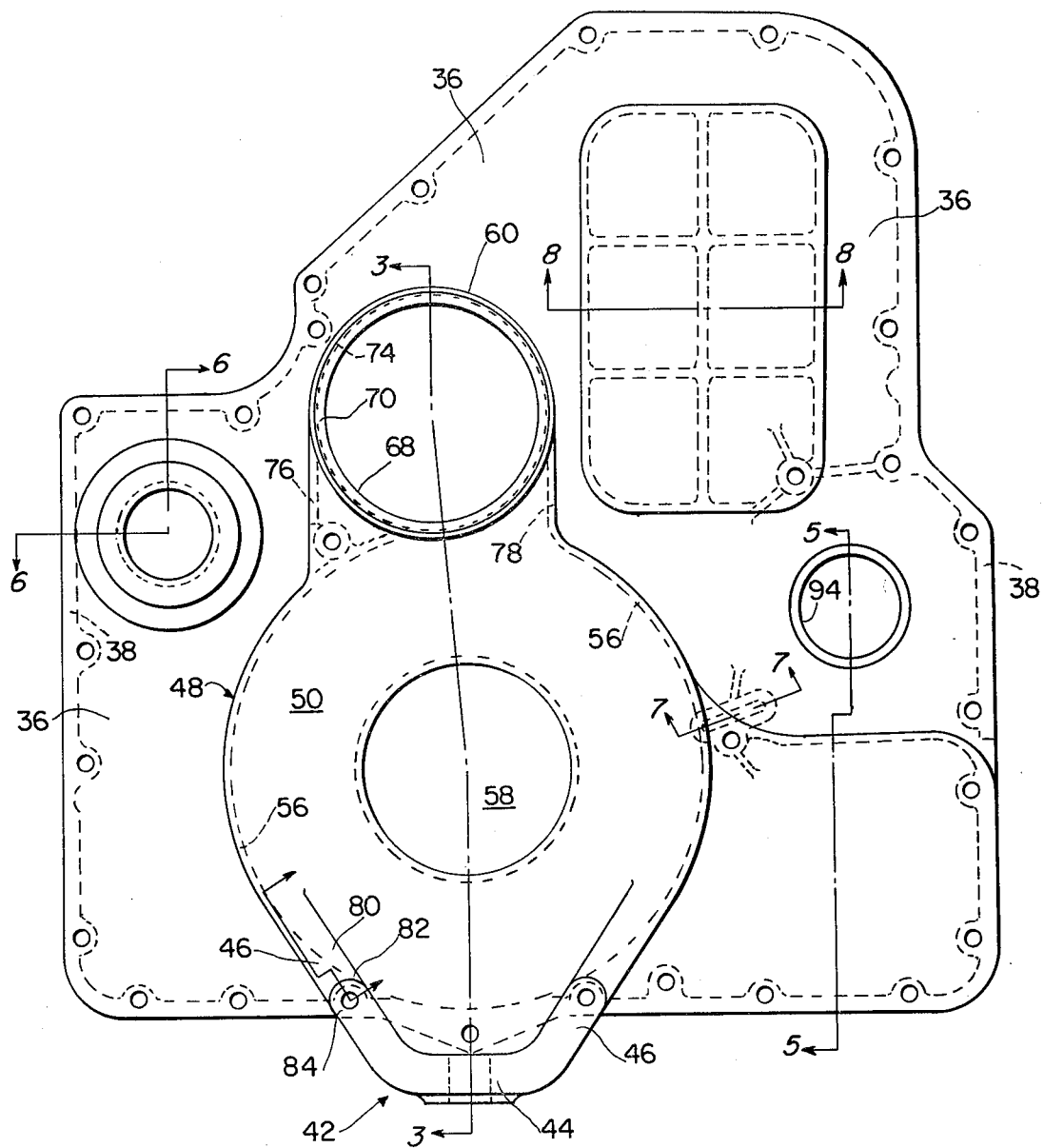
FIG. 2 is a front elevational view of the gear cover illustrated in FIG. 1.

Now referring jointly to FIGS. 1 and 2, the gear cover 32 includes a front panel 36 arranged to be positioned outwardly of the gear train in a generally parallel, spaced relationship to the end wall 20 of the internal combustion engine. Around the perimeter of the front panel 36 is a side wall 38 integrally connected to the front panel and extending in a first direction generally perpendicularly from the outer edge of the front panel 36 terminating in a rim 40 spaced from the front panel by a distance sufficient to cause the front panel 36 to clear the gears of the gear train 24. Thus, the side wall 38 must extend in a perpendicular direction from the front panel 36 by an amount at least slightly greater than the distance by which the drive gear and all other gears of the gear train are spaced outwardly from the end wall 20 of the internal combustion engine.

Integrally formed with the gear cover 32 is an engine mount 42 including a base plate 44 positioned below the lowermost portion of the side wall 38 when the gear cover 32 is mounted on the engine. The base plate 44 extends outwardly beyond the front panel 36 of the gear cover in the direction generally perpendicular to the plane defined by front panel 36. A pair of reinforcing webs 46 extend between base plate and the lower portion of gear cover. As is apparent in FIGS. 1 and 2, the reinforcing webs 46 intersect and are integrally joined with the lower portion of side wall 38. As is best illustrated in FIG. 2, the front panel 36 includes a forwardly projecting portion for forming a damper housing means 48 having a generally annular configuration concentric with the point of intersection of the rotational axis of the crankshaft when the gear cover is mounted on the internal combustion engine. The damper housing means 48 includes a forward wall 50 parallel to and spaced from the front panel 36 by a distance approximately equal to the distance between the outer extremity 52 of the drive gear 26 and the outer extremity 54 of the vibration damper 18. A connecting wall 56 having a generally annular cross-section extends between the front panel 36 and the forward wall 50 to complete an enclosure for receiving vibration damper 18 as illustrated in FIG. 1.

In order to raise the natural frequency of the internal combustion engine on which the subject gear housing is mounted, the front panel 36 contains natural frequency increasing means including an annular recess 58 formed in the forward wall 50 of the damper housing means 48 to thereby form a depression into the enclosure of the gear housing 4. Annular recess 58 is positioned generally concentrically with respect to the rotational axis of the crankshaft when the gear cover 36 is properly mounted on the internal combustion engine. Calculations have shown that the natural frequency of the disclosed gear cover can be increased by providing the recess 58. The propensity of an internal combustion engine to emit noise has been determined to be in part a function of natural frequency of the engine itself. By reducing the natural frequency of the various components attached to and forming a portion of the engine, the effect can be to reduce the amount of noise actually emitted by the engine during operation. The recess 58 also contributes to stiffening and reinforcing the lower portion of the gear cover in the area adjacent the integral connection of the front panel 36 and the engine mount 42.

It should be noted that normally the vibration damper of a combustion engine is mounted externally to the engine which would thereby require forward wall 50 to be interposed between the vibration damper and the drive gear 26. Such an arrangement requires the provision of a seal around the projecting end 16 of the crankshaft 10. By encasing the vibration damper within the gear cover, the need for the seal between wall 50 and the crankshaft can be eliminated thus not only decreasing the cost of manufacturing the gear cover but also permitting the overall length of the engine measured along the axis of rotation of the crankshaft to be reduced by an amount equal to the normal axial length of a seal. While not significant to the overall engine length, the advanced state of internal combustion engine design means that even a slight modification leading to a reduction in the overall size of the engine can be a major accomplishment.

In addition to the damper housing means 48, the front panel 36 may also be provided with a clutch housing means 60 for receiving and enclosing a fan clutch 62 having an input 64 connected with the gear train and output shaft 66 projecting outwardly through an aperture 68 in the fan clutch housing means 60. The fan clutch housing means 60 includes a protruding end wall 70 parallel to and spaced from the front panel 36 as well as the forward wall 50 of the damper housing means 48. The projecting end 72 of output shaft 66 is adapted to be connected with an engine fan, not illustrated. The protruding end wall 70 is connected to the front panel 36 by an annular connecting wall 74. Tangential sections 76 and 78 of the annular connecting wall 74 both extend downwardly and intersect with the connecting wall 56 of the damper housing means 48.

Figure 3:
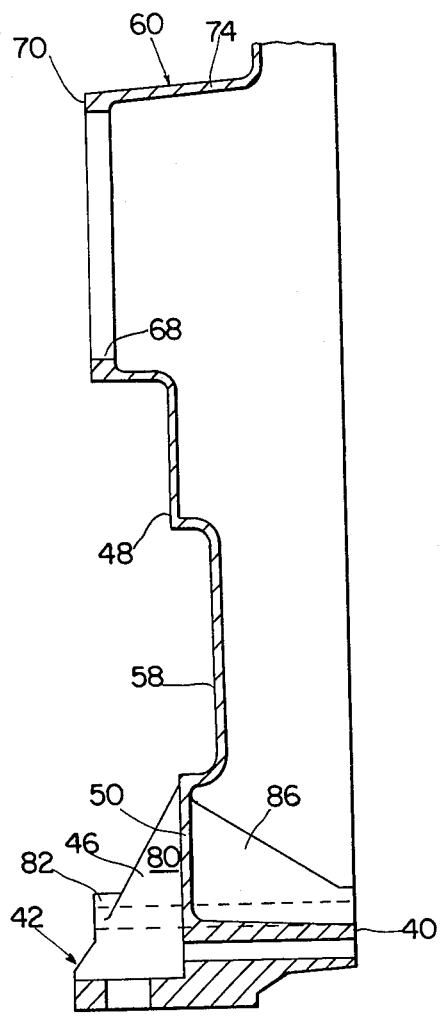
FIG. 3 is a cross-sectional view of the vibration damping means and fan clutch housing means taken along lines 3—3 of the gear cover illustrated i-FIG. 2.

FIG. 3 is a cross-sectional view of the damper housing means 48 and the fan clutch housing means 60. Those reference numerals used in FIGS. 1 and 2 have been applied to the corresponding elements illustrated in FIG. 3.

Figure 4:
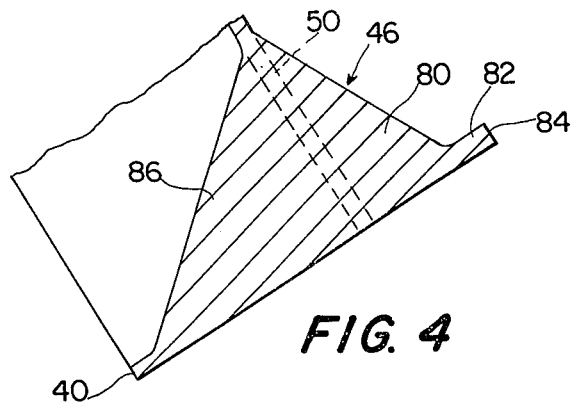
FIG. 4 is a cross-sectional view of a reinforcing web forming a portion of the engine mount taken along the line 4—4 of the gear cover illustrated in FIG. 2.

Turning now to FIG. 4, the configuration of one of the reinforcing webs 46 is illustrated in cross-sectional form. From FIG. 4, it is apparent that each reinforcing web 46 includes a triangular-shaped portion 80 intersecting with forward wall 50 and a connecting boss 82 extending from the forward edge of the reinforcing web 46 to the rim surface 40 which contacts the gear plate 28. On the inside surface of the gear cover 32, a second triangular web 86 is formed between the intersection of forward wall 50 and connecting boss 82 which, as illustrated in FIGS. 2 and 4, is positioned at the intersection of connecting walls 56 and side wall 38. It is apparent that this arrangement of the reinforcing webs 46 has the effect of creating an extremely rigid, high strength connection between the base plate 44 of engine mount 42 and the remaining portions of the gear plate 28. This rigidity is provided in large measure by the reinforcing and rigidifying effects of the damper housing means. In particular, the damper housing means 48 operates to spread the bending forces produced by the engine mount 42 over a much broader area of the gear cover 32 by utilizing the rigidifying effect of connecting wall 56 which is positioned perpendicularly with respect to front panel 36.

Figure 5:
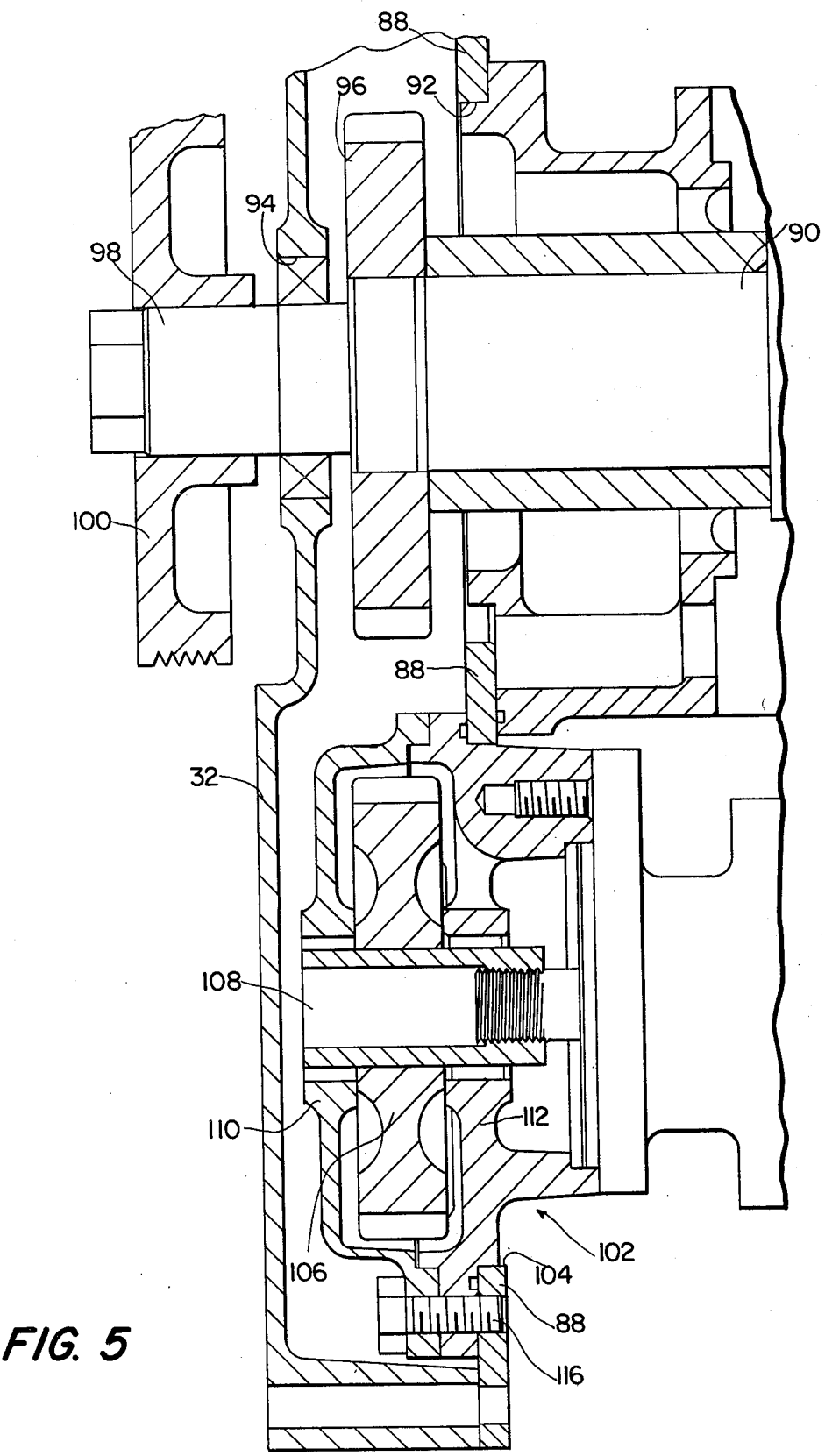
FIG. 5 is a cross-sectional view taken along the lines 5—5 of the gear cover illustrated in FIG. 2.

FIG. 5 is a cross-sectional view taken along the lines 5—5 of the gear cover 32 illustrated in FIG. 2. Superimposed upon this cross-sectional view are corresponding radial gears forming part of the gear train 24 as well as the output shafts connected with each corresponding gear. In particular, cross-section 5—5 of the gear cover of FIG. 2 is taken along that portion of the gear cover 32 which is spaced from an extension 88 of gear plate 28. The extension 88 extends laterally beyond the side wall of the engine block to permit engine accessories to be mounted directly to the side of the gear plate 28. In particular, the drive shaft 90 of the engine air compressor (not illustrated) is shown as extending through aligned apertures 92 and 94 formed in the gear plate extension 88 and the gear cover 32, respectively. Keyed to shaft 90 within the gear housing is a radial gear 96 forming part of the gear train as will be explained more fully hereinbelow. A projecting end 98 of shaft 90 includes a pulley 100 for providing a driving connection to an alternator or an air conditioning compressor, not illustrated.

Below shaft 90 is a power steering or hydraulic pump drive assembly mounted 102 within aperture 104 contained in the gear plate extension 88. The power steering or hydraulic pump drive assembly 102 includes a radial gear 106 engaged with the gear train 24 and keyed to a shaft 108 rotatably mounted within a journal housing 114 having a pair of complementary cup-shaped halves 110 and 112. The journal housing 114 formed by the cup-shaped halves is connected with the gear plate extension 88 by a plurality of connecting bolts 116, onlye one of which is illustrated in FIG. 5.

Figure 6:
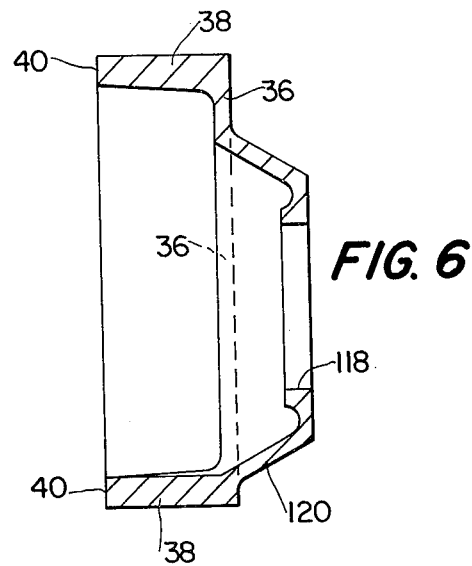
FIG. 6 is a cross-sectional view taken along the lines 6—6 of the gear cover illustrated in FIG. 2.

FIG. 6 discloses, in a cross-sectional view, yet another portion of the gear cover of FIG. 2 taken along lines 6—6. In particular, this portion of the gear cover includes an aperture 118 formed in an outwardly projecting depression 120 of the front panel 36. Aperture 118 is co-axial with a corresponding aperture formed in the gear plate 28, not illustrated in FIG. 6. An output shaft is rotatably received within the co-axial apertures for driving connection with the engine water pump on the gear plate side and for driving connection with a pulley on the gear cover side. The pulley may be used to power a Freon compressor for use in an air conditioning system or an alternator.

Figure 7:
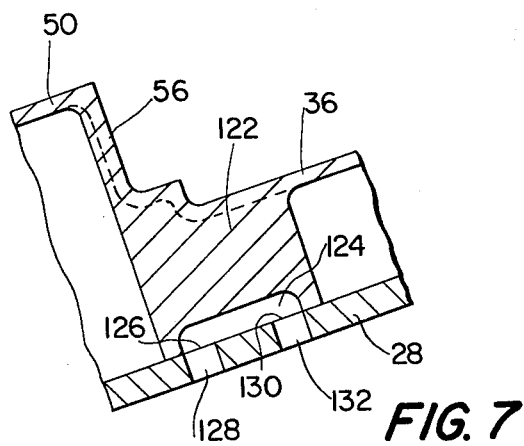
FIG. 7 is a cross-sectional view of a lubrication fluid transfer boss taken along lines 7—7 of the gear cover illustrated in FIG. 2.

As will be explained in more detail hereinbelow, the engine block on which the subject gear housing is mounted may be provided with a lubrication fluid passage which includes a discharge aperture adjacent the end wall 20 of the engine. FIG. 7 is a cross-sectional view of yet another portion of the gear cover illustrated in FIG. 2 taken along lines 7—7. This portion of the gear cover includes a lubrication transfer boss 122 registering generally with the discharge opening of the engine and the lubrication fluid inlet to the air compressor, neither of which is illustrated in FIG. 7. The lubrication fluid transfer 122 includes a passage 124 communicating at one end 126 with the discharge opening of the internal combustion engine through a correspondingly positioned inlet aperture 128 formed in the gear plate 28. At the opposite end 130 of passage 124, an outlet aperture 132 is formed in gear plate 28 in registry with the inlet opening of the air compressor, whereby a fluid circuit is formed between the lubrication supply system of the internal combustion engine through the gear cover and into the air compressor. This arrangement of passages within the engine block and gear cover results in an overall streamlining of the engine design. Such streamlining prevents improper connection of conduits which would otherwise be required on the exterior of the assembled engine. Even if properly connected, such conduits are more vunerable to damage.

Figure 8:
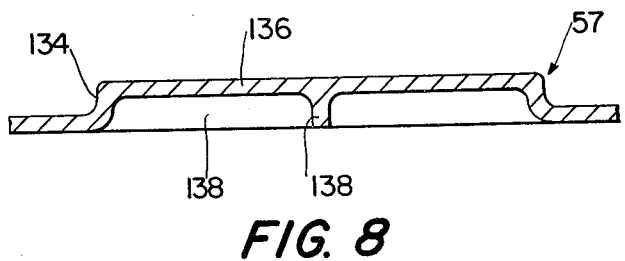
FIG. 8 is a cross-sectional view of one portion of the natural frequency increasing means taken along the lines 8—8 of the gear cover illustrated in FIG. 2.

Referring to FIG. 8, a cross-sectional view of another portion of the natural frequency means 57 is illustrated in cross-sectional view taken along lines 8—8 of the gear cover illustrated in FIG. 2. In particular, FIG. 8 discloses a projection 134 formed in the front panel and including a rectangular reinforced wall 136 defining a plane which is generally parallel to and spaced forwardly of the front panel 36. On the inside surface of wall 136, a plurality of intersecting reinforcing webs 138 are formed. The purpose of the structure illustrated in FIG. 8 is to increase the natural frequency of the gear cover to thereby raise the natural frequency of the assembled engine structure to reduce noise during engine operation. While an increase in the gear cover natural frequency cannot alone have a substantial effect on the overall noise level created during engine operation, an increase in the natural frequency of this portion of the engine assembly in combination with other portions of the engine could have an effect on the total noise level created during engine operation.

Figure 9:
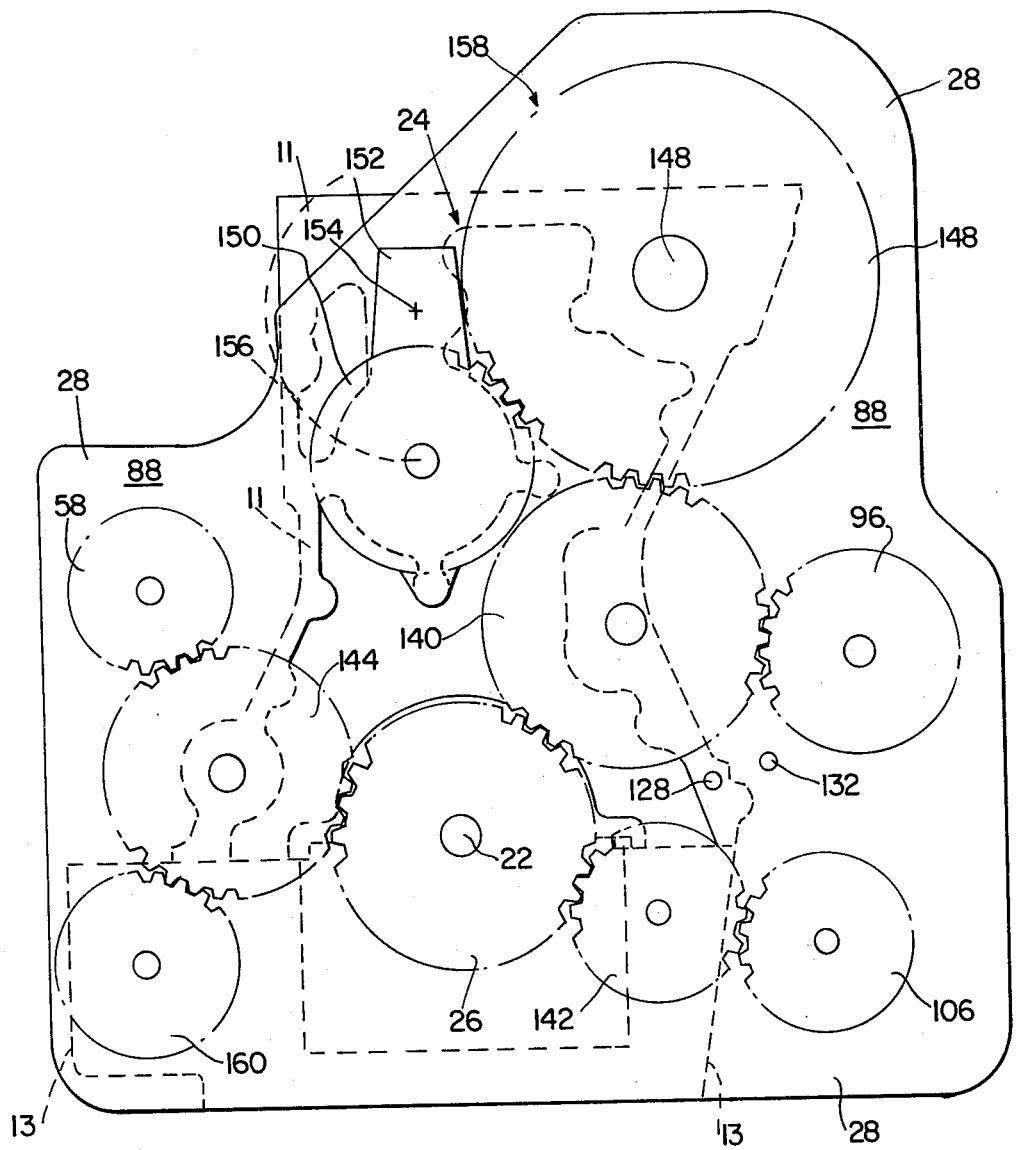
FIG. 9 is a front elevational view of the gear housing designed in accordance with the subject invention in which the gear cover has been removed to expose the gear train adapted to be encased therein.

Referring now to FIG. 9, an elevational view of the gear train 24 is illustrated with the gear cover 32 removed. The gear plate 28 is illustrated in FIG. 9 in a position behind the gear train 24 and mounted on the composite engine structure shown in dashed lines. As is apparent in FIG. 9, the composite engine structure includes a main frame 11 mounted above an oil pan adapter or ladder frame 13 all of which is described in greater detail in the co-pending application identified above and entitled Composite Engine Block Having High Strength to Weight Ratio. FIG. 9 graphically illustrates how the gear plate 28 extends laterally beyond the side edges of the composite engine block in a plane generally perpendicular to the rotational axis 22 of the crankshaft.

As illustrated in FIG. 9, the gear train 24 includes a main drive gear 26 discussed above with reference to FIG. 1. The drive gear 26 is keyed to the projecting end of the crankshaft and in turn is connected to three radial idler gears 140, 142, and 144. Each of the idler gears is rotatably mounted on a shaft journaled in an assembly bolted through the gear plate 28 into corresponding bosses formed in the composite engine block. Although not illustrated in FIG. 9, each of the bosses is connected with the lubrication circuit of the composite engine block through internal passages formed within the engine block. The lubrication fluid supplied thereto is in turn directed to the bearing surfaces of the individual idler shafts to provide continuous lubrication thereof. Idler gear 142 engages an output radial gear 106 referred to above with reference to FIG. 5. This gear is keyed to an output shaft which, in turn, drives the power steering or hydraulic pump. Idler gear 140 is in driving connection with radial gear 96 also referred to above with reference to FIG. 5 wherein gear 96 is illustrated as being keyed to a shaft mounted to provide driving torque to the air compressor and to a driving pulley for operating the engine alternator or air conditioning compressor. Idler gear 140 also engages and drives radial gear 148 keyed to the camshaft, not illustrated, of the engine to provide synchronized rotation of the camshaft with the rotation of the crankshaft.

The gear train 24 further includes a radial gear 150 mounted on the input to the fan clutch 62, illustrated in FIG. 1, to provide driving torque to the fan of the internal combustion engine. The clutch assembly 62 is mounted on an arm support 152 which in turn is supported on the gear cover and engine block for adjustable rotational positioning about an axis 154. The fan clutch assembly 62 may be rotated upwardly along the arc illustrated by dash lines 156 into engagement at point 158 with the idler gear 148 to raise the position of the engine fan for certain applications of the engine wherein the fan must be placed well above the lowermost portion of the engine. Support arm 154 is provided with an internal lubrication flow path to supply lubrication fluid to the fan clutch assembly. Naturally when the fan clutch assembly is moved to its upper position, the gear cover and gear plate must be modified accordingly to accommodate the upper position of the fan clutch assembly.

Idler gear 144 engages radial gear 158 mounted on a shaft extending through aligned apertures in both the gear plate and gear cover as discussed above with regard to FIG. 6. In particular, the shaft connected with gear 158 is designed to drive the engine water pump located on the gear plate side and to provide driving torque to a pulley mounted on the gear cover side to in turn drive an air conditioning compressor or alternator mounted on the engine. Also drivingly engaged with idler gear 144 is a radial gear 160 designed to provide driving torque to the engine oil pump located within a housing formed integrally within the ladder frame 13 all as described more fully in assignee's co-pending application referred to above and entitled Composite Engine Block Having High Strength to Weight Ratio.

Industrial Applicability

A gear housing assembly has thus been disclosed having extremely lightweight, high-strength characteristics and operational noise damping capabilities. These characteristics made the disclosed gear housing particularly ideal for compression ignition engines of the type generally employed in over-the-road vehicles. The lightweight of the subject design improves the overall fuel efficiency of any vehicle equipped with an engine employing the disclosed gear cover housing. The lightweight, low noise characteristics and the compact size also make the disclosed gear cover ideal for other applications such as portable compressor units, marine propulsion systems and other types of industrial applications in which portability and/or low noise operating characteristics are desired.

I claim:

1. A gear cover for the accessory gear train of an internal combustion engine, which internal combustion engine includes an engine block having an end wall, an engine crankshaft extending from the end wall, a drive gear mounted on the crankshaft outward of the end wall, a crankshaft vibration damper secured to the crankshaft outward of the drive gear, and at least one accessory gear mounted in the radial plane defined by the driving gear, said gear cover comprising:

(a) a front panel arranged to be positioned outwardly of the drive and accessory gears in a generally parallel, spaced relationship to the end wall;

(b) a side wall integrally connected to the peripheral portion of said front panel and extending therefrom in a generally perpendicular direction to terminate in a rim adjacent the end wall; and (c) damper housing means connected to said front panel for receiving and completely enclosing the crankshaft vibration damper when said gear cover is mounted on the internal combustion engine, said damper housing means including a forward wall parallel to and spaced outwardly from said front panel by a predetermined distance, said damper housing means also including a natural frequency increasing means for increasing the natural frequency of the internal combustion engine to reduce the amount of noise emitted by the internal combustion engine during engine operation, said natural frequency increasing means having an annular surface recessed relative to said forward wall of said damper housing means and arranged concentrically with respect to the rotational axis of the engine crankshaft when said gear cover is mounted on the internal combustion engine.

2. A gear cover for the accessory gear train of an internal combustion engine, which internal combustion engine includes an engine block having an end wall, an engine crankshaft extending from the end wall, a drive gear mounted on the crankshaft outward of the end wall, a crankshaft vibration damper secured to the crankshaft outward of the drive gear, and at least one accessory gear mounted in the radial plane defined by the driving gear, said gear cover comprising:

(a) a front panel arranged to be positioned outwardly from the drive and accessory gears in a generally parallel, spaced relationship to the end wall;

(b) a side wall integrally connected to the peripheral portion of said front panel and extending therefrom in a generally perpendicular direction to terminate in a rim adjacent the end wall; and (c) damper housing means connected to said front panel for receiving and completely enclosing the crankshaft vibration damper when said gear cover is mounted on the internal combustion engine, said damper housing means including a forward wall parallel to and spaced outwardly from said front panel by a predetermined distance, said damper housing means also including a connecting wall extending between said forward wall and said front panel in a manner such that said damper housing means stiffens and reinforces the lower portion of said gear cover.

3. A gear cover as set forth in claims 1 or 2, including an engine mounting means integrally connected to said front panel for supporting one end of the engine entirely through the gear cover.

4. A gear housing for the accessory gear train of an internal combustion engine, which internal combustion engine includes an engine block having an end wall, an engine crankshaft extending from the end wall, a drive gear mounted on the crankshaft outward of the end wall, a crankshaft vibration damper secured to the crankshaft outward of the drive gear, and at least one accessory gear mounted in the radial plane defined by the driving gear, said gear housing comprising:

(a) a gear plate arranged to be mounted on the end wall of the engine intermediate the accessory gear train and the end wall, said gear plate including side extensions shaped to extend outwardly beyond the sides of the engine, said side extensions containing openings through which driving connections can be made between accessories mounted on the sides of the engine and individual gears in the accessory gear train; and (b) a gear cover for cooperating with said gear plate to enclose the accessory gear train completely, said gear cover including:

(1) a front panel arranged to be positioned outwardly from the accessory gear train in a generally parallel, spaced relationship to said gear plate, (2) a side wall integrally connected to the peripheral portion of said front panel and extending therefrom in a generally perpendicular direction to terminate in a rim adjacent the end wall such that said rim is spaced from said front panel by a distance slightly greater than the distance at which the drive gear is spaced outwardly from said gear plate; and (3) damper housing means connected to said front panel for receiving and completely enclosing the crankshaft vibration damper when said gear cover is mounted on the internal combustion engine, said damper housing means including a forward wall parallel to and spaced outwardly from said front panel by a predetermined distance, said damper housing means also including a natural frequency increasing means for increasing the natural frequency of the internal combustion engine to reduce the amount of noise emitted by the internal combustion engine during engine operation, said natural frequency increasing means having an annular surface recessed relative to said forward wall of said damper housing means and arranged concentrically with respect to the rotational axis of the engine crankshaft when said gear cover is mounted on said gear plate.

5. A gear housing for the accessory gear train of an internal combustion engine, which internal combustion engine includes an engine block having an end wall, an engine crankshaft extending from the end wall, a drive gear mounted on the crankshaft outward of the end wall, a crankshaft vibration damper secured to the crankshaft of the drive gear, and at least one accessory gear mounted in the radial plane defined by the driving gear, said gear housing comprising:

(a) a gear plate arranged to be mounted on the end wall of the engine intermediate the accessory gear train and the end wall, said gear plate including side extensions shaped to extend outwardly beyond the sides of the engine, said side extensions containing openings through which driving connections can be made between accessories mounted on the sides of the engine and individual gears in the accessory gear train; and (b) a gear cover for cooperating with said gear plate to enclose the accessory gear train completely, said gear cover including (1) a front panel arranged to be positioned outwardly from the accessory gear train in a generally parallel, spaced relationship to said gear plate, (2) a side wall integrally connected to the peripheral portion of said front panel and extending therefrom in a general perpendicular direction to terminate in a rim adjacent the end wall such that said rim is spaced from said front panel by a distance slightly greater than the distance at which the drive gear is spaced outwardly from said gear plate, and (3) damper housing means connected to said front panel for receiving and completely enclosing the crankshaft vibration damper when said gear cover is mounted on the internal combustion engine, said damper housing means including a forward wall parallel to and spaced outwardly from said front panel by a predetermined distance, said damper housing means also including a connecting wall extending between said forward wall and said front panel in a manner such that said forward wall stiffens and reinforces the lower portion of said gear cover.

6. A gear cover as set forth in claims 4 or 5, including an engine mounting means integrally connected to said front panel for supporting one end of the engine entirely through said gear cover and said gear plate.

7. A gear cover as defined in claim 3 wherein said rim is spaced from said front panel by a distance slightly greater than the distance by which the drive gear is spaced outwardly from the end wall of the internal combustion engine.

8. A gear cover as defined in claim 7, wherein said forward wall of said damper housing is parallel to and spaced from said front panel by a distance approximately equal to the distance between the outer extremity of the drive gear and the outer extremity of the crankshaft vibration damper, and said damper housing means further includes a connecting wall extending between the perimeter of said forward wall and said front panel.

9. A gear cover as defined in claim 8, wherein said engine mounting means includes a base plate positioned below the lowermost portion of said side wall when the cover is mounted on the engine, and said base plate extends outwardly beyond said forward wall in a direction generally perpendicular to the plane defined by said forward wall, and wherein said mounting means includes a pair of reinforcing webs extending between said base plate and said forward wall, said reinforcing webs intersecting and integrally joining with said side wall.

10. A gear cover as defined in claim 9, further including a clutch housing means integrally connected with said front panel for receiving and enclosing a fan clutch having an input connected with the gear train and an output shaft projecting outwardly in parallel relationship with the crankshaft, said clutch housing means including a protruding end wall parallel to and spaced from said front panel, said protruding end wall being outwardly spaced from the plane defined by said forward wall, said protruding end wall containing an aperture through which the output shaft of the fan clutch projects forwardly for attachment with an engine fan.

11. A gear cover as defined in claim 10, wherein the engine is provided with an lubrication fluid passage which includes a discharge aperture adjacent the end wall of the engine on which the gear train is supported and wherein the engine is provided with mounting structure for supporting an air compressor on one side of the engine having a lubrication fluid inlet opening adjacent the end wall and further wherein the gear train includes an air compressor drive gear for driving a shaft mounted to project rearwardly along the side of the engine to provide a driving torque to the air compressor, wherein said front panel includes a lubrication fluid transfer boss for registering with the discharge opening of the engine and the lubrication fluid inlet when the cover is mounted on the engine, said lubrication fluid transfer boss including a passage communicating at one end with the discharge aperture and communicating at the other end with the lubrication fluid inlet opening.

12. A gear cover as defined in claim 3, including an outward projection formed in said front panel, said outward projection having a rectangular reinforced wall defining a plane which is parallel to and spaced forwardly from said front panel, said reinforced wall having intersecting reinforcing ribs formed on the inside surface thereof.

13. A gear housing as defined in claim 6, wherein said forward wall of said damper housing is parallel to and spaced from said front panel by a distance slightly greater than the distance between the outer extremity of the drive gear and the outer extremity of the crankshaft vibration damper, and said damper housing means further includes a connecting wall extending between the perimeter of said forward wall and said front panel.

14. A gear housing as defined in claim 13, wherein said engine mounting means includes a base plate positioned below the lowermost portion of said side wall when the cover is mounted on the engine and, said base plate extending outwarding beyond said forward wall in a direction generally perpendicular to the plane defined by said forward wall, and wherein said mounting means includes a pair of reinforcing webs extending between said base plate and said forward wall, said reinforcing webs intersecting and integrally joining with said side wall.

15. A gear housing as defined in claim 14 further including clutch housing means integrally connected with said front panel for receiving and enclosing a fan clutch having an input connected with the gear train and an output shaft projecting outwardly through an aperture in said gear plate in parallel relationship with the crankshaft, said clutch housing means including a protruding end wall parallel to said forward wall, said protruding end wall being outwardly positioned from the plane defined by said forward wall, said protruding end wall containing an aperture through which the output shaft of the fan clutch projects forwardly for attachment with an engine fan.

16. A gear housing as defined in claim 15, wherein the engine is provided with an lubrication fluid passage which includes a discharge aperture adjacent the end wall of the engine on which the gear train is supported and wherein the engine is provided with mounting structure for supporting an air compressor on one side of the engine having a lubrication fluid inlet opening adjacent the end wall and further wherein the gear train includes an air compressor drive gear for driving a shaft mounted to project rearwardly through an aperture in said gear plate along the side of the engine to provide a driving torque to the air compressor, wherein said gear plate includes a first aperture registering with said first and second apertures when said cover is mounted on the engine, said lubrication fluid transfer boss including a passage communicating at one end with said first aperture and communicating at the other with said second aperture.

17. A gear housing as defined in claim 6, including an outward projection formed in said front panel, said projection having a rectangular reinforced wall defining a plane which is parallel to and spaced forwardly from said front panel, said reinforced wall having intersecting reinforcing ribs formed on the inside surface thereof.

* * * * *